(12) United States Patent
Taboryski et al.

(10) Patent No.: US 7,037,082 B2
(45) Date of Patent: May 2, 2006

(54) CORBINO DISC ELECTROOSMOTIC FLOW PUMP

(75) Inventors: Rafael Taboryski, Bagsvord (DK); Jonatan Kutchinsky, Ballerup (DK); Morten Bech, Gl. Holte (DK)

(73) Assignee: Sophion Bioscience A/S, Ballerup (DK)

( * ) Notice: Subject to any disclaimer, the term of this patent is extended or adjusted under 35 U.S.C. 154(b) by 22 days.

(21) Appl. No.: 10/491,415

(22) PCT Filed: Oct. 2, 2002

(86) PCT No.: PCT/DK02/00657

§ 371 (c)(1),
(2), (4) Date: Jul. 9, 2004

(87) PCT Pub. No.: WO03/028861

PCT Pub. Date: Apr. 10, 2003

(65) Prior Publication Data

US 2004/0241006 A1 Dec. 2, 2004

Related U.S. Application Data

(60) Provisional application No. 60/326,196, filed on Oct. 2, 2001.

(51) Int. Cl.
*F04F 11/00* (2006.01)
*H02K 44/00* (2006.01)
*G01N 27/27* (2006.01)

(52) U.S. Cl. .................. 417/48; 417/50; 204/600; 204/601; 204/604

(58) Field of Classification Search .................. 417/48, 417/50; 204/600, 601, 604
See application file for complete search history.

(56) References Cited

U.S. PATENT DOCUMENTS

| | | | | |
|---|---|---|---|---|
| 3,923,426 A | * | 12/1975 | Theeuwes | .................. 204/630 |
| 5,171,409 A | | 12/1992 | Barnier et al. | |
| 5,632,876 A | | 5/1997 | Zanzucchi et al. | |
| 6,394,759 B1 | * | 5/2002 | Parce | .................. 417/48 |
| 2003/0075445 A1 | * | 4/2003 | Woudenberg et al. | ...... 204/451 |

FOREIGN PATENT DOCUMENTS

| | | |
|---|---|---|
| EP | 0485370 A2 | 5/1992 |
| GB | 2141737 A | 1/1985 |
| WO | WO 01/36321 A1 | 5/2001 |

* cited by examiner

*Primary Examiner*—Timothy S. Thorpe
*Assistant Examiner*—Christopher H. Orders
(74) *Attorney, Agent, or Firm*—Birch, Stewart, Kolasch & Birch, LLP

(57) ABSTRACT

The present invention provides a pump for generating an Electroosmotic Flow (EOF) in a solution in a canal, guide, pipe or equivalent. Electroosmotic flow is generated by application of an electric field through a solution in a canal defined by insulating walls. The phenomenon depends on ionisation of sites on the surface so that for electroneutrality there is an excess mobile charge in the solution. The electric field acts on the excess charge in the solution causing the fluid to flow. The quantity and distribution of excess charge in the solution depends on the solution and the surface materials and is related to a parameter, the zeta (z) potential characterising material/solution combinations.

4 Claims, 3 Drawing Sheets

CORBINO DISC ELECTROOSMOTIC FLOW PUMP

This application is the national phase of PCT/DK02/00657 filed Oct. 2, 2002 which claims priority on provisional application No. 60/326,196, filed on Oct. 2, 2001.

The present invention provides a pump for generating an Electroosmotic Flow (EOF) in a solution in a canal, guide, pipe or equivalent. Electroosmotic flow is generated by application of an electric field through a solution in a canal defined by insulating walls. More particular, the invention provides an EOF pump design based on two closely spaced, parallel, circular plates with a hole in the central part of one of the plates—known as a Corbino disc. The EOF pump can be readily integrated in small systems such as Microsystems, micromachines, microstructures etc. and allows for an efficient and easily controllable liquid flow in such systems.

According to the present invention, an electroosmotic flow in an ionic solution in a canal may be generated using an electrical field. In order to create the electroosmotic flow, the geometry as well as the materials of the canal has to be carefully chosen. It is an advantage of the present invention that it provides a pump for generating and controlling liquid flow in small flow systems. Moreover, the pump according to the invention may be fabricated using materials and processing technology typically used to fabricate small-scale systems and devices, such as chips, microsystems, micromachines, microstructures, microfluidic systems, etc. The pump according to the invention may thereby be integrated in such small-scale systems and devices and provide an efficient and flexible liquid handling.

According to a first aspect, the present invention provides an electroosmotic flow pump for generating a flow in an ionic solution from an inlet to an outlet in a canal. The electroosmotic flow pump preferably comprises a housing with the canal for holding the ionic solution, a first electrode and a second electrode positioned so as to be in electrical contact with ionic solution held in the canal, means for impressing an electric potential difference between the first and second electrodes, first at least substantially circular plate of radius $r_{out\ 1}$, a second at least substantially circular plate of radius $r_{out\ 2}$, having a central annular hole of radius $r_{in}$, the first and the second plate being positioned opposite each other in an at least substantially parallel and concentric configuration at a distance d in the canal. The first and the second plate are preferably positioned so that an electrical path between the first and second electrodes passes the intervening space between the plates and so that the flow passes the intervening space between the plates and through the hole in the second plate. Also, all lateral dimensions are preferably much larger than the vertical dimension, $r_{out\ 1}$, $r_{out\ 2}$, $r_{in} \gg d$. Further, facing surface parts of the first and second plates preferably have a zeta potential $\zeta > 10$ mV in an 130–160 mM aqueous salt solution with pH value in the interval 7–7.5.

In preferred embodiments of the invention, the distance d between the first and second plates is in the interval 0.1–2 μm. Also, the outer radii $r_{out\ 1}$ and $r_{out\ 2}$ of the first and second plates are in the interval 0.02–1.0 cm. Further, the inner radius $r_{in}$ of the hole in the second plate is in the interval 0.01–0.5 cm.

DETAILED DESCRIPTION

Figure 1:
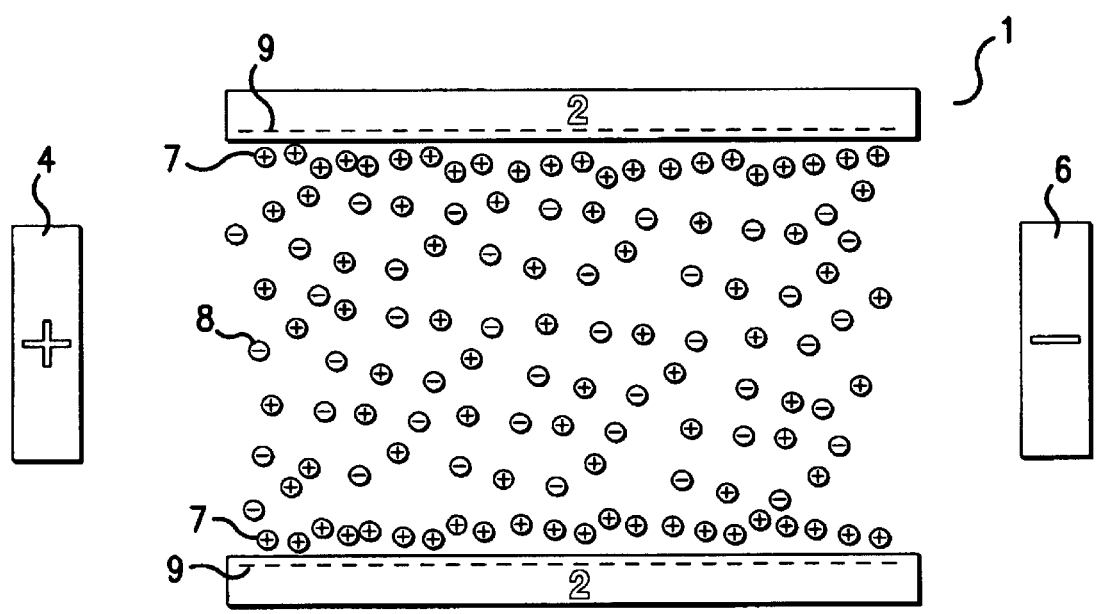
FIG. 1 is an illustration of the principle of electroosmotic flow in a canal.

If an ionic liquid in a canal is set in motion using electric fields the phenomenon is called electroosmosis. Electroosmotic flow is generated by application of an electric field through a solution in a canal defined by insulating walls, a schematic illustration of a canal 1 is shown in FIG. 1. The canal 1 is formed by walls 2 with electrodes 4 and 6 in each end. A liquid held in the canal 1 is an ionic solution having positive ions 7 and negative ions 8.

The phenomenon depends on ionisation of electronegative sites 9 on surfaces of the walls 2 so that for electroneutrality there is an excess mobile charge in the solution, predominantly located close to the walls within a thin screening layer given by the Debye length $\lambda_D \approx 1$–10 nm for the interface. An electric field applied to the solution acts on the excess charge in the screening layer causing the fluid to flow. The quantity and distribution of excess charge in the solution depends on the surface material (density of ionisable sites) and on the solution composition, especially pH and ionic concentration. The charge and distribution is related to a parameter, the zeta ($\zeta$) potential, which can be related to electroosmotic flow. However, although values for the zeta potential are measured and published for material/solution combinations it is not really a readily controllable parameter, and as it arises from the ionisation of surface sites, $\zeta$ and EOF are very susceptible to changes in surface condition and contamination. A value of 75 mV for $\zeta$ is given in the literature for a silica surface. For glass the values may be twice those for silica but for both the effects of pH and adsorbing species can in practice very significantly reduce the values. Such a value for $\zeta$ may be used in design calculations but it is wise to ensure that adequate performance is not dependant on it being achieved in practice. The direction of EOF is determined by the excess mobile charge in the solution generated by ionisation of the surface sites. As pKa for the ionisable groups on silica or silicate glass is ~2, then at neutral pH values the surface is negatively charged and EOF follows the mobile positive ions towards a negatively polarised electrode. The volume flow rate $$I_{vol}^{eof}$$

associated with electroosmotic flow for a flow canal of length L, and constant cross sectional area A is given by $$I_{vol}^{eof} = \frac{A\varepsilon\zeta}{L\eta}U, \tag{1}$$

where $\varepsilon$ is the permittivity and $\eta$ the viscosity of the liquid, while $\zeta$ is the zeta potential of the interface between the liquid and the canal boundaries. U is the driving voltage applied across the ends of the canal with length L and constant cross sectional area A. Eq. 1 defines the maximum possible flow rate an EOF pump can deliver with no load connected. The average velocity of the fluid particles in the canal is in general given by $u=I_{vol}/A$, and the electric field strength by $E=U/L$, allowing the definition of the electroosmotic mobility $\mu_{rof}=u/E=\epsilon\zeta/\eta$ to be independent of any particular geometry of the flow canal containing the EOF pump, and solely to characterise the interface between the liquid and the walls. With a load connected to the pump, the EOF driving force will be accompanied with a pressure driven flow (Poiseuille flow). The volume flow rate associated with laminar Poiseuille flow is given by $$I_{vol}^{Poiseuille} = K_{channel}\Delta p,$$

where $\Delta p$ is the pressure difference across each end of the flow canal, and $K_{canal}$ the flow conductance of the canal. The total flow rate is then given by $$I_{vol} = K_{channel}\Delta P + \frac{A\mu_{eof} U}{L}. \qquad (2)$$

The pressure compliance of the pump is found by putting $I_{vol}=0$, and solving for $\Delta p$:

$$\Delta p_{max} = \frac{I_{vol}^{eof}}{K_{channel}}. \qquad (3)$$

The overall performance of any particular EOF pump can be quantified by the performance power given by the product $$\Delta p_{max} I_{vol}^{eof},$$

which is a quantity expressed in the unit Watt. The higher power, the better is the overall performance of the pump. If the pump is loaded with flow conductance $K_{load}$ at one end, and a reference pressure at the other end, the pressure difference across the load relatively to the reference pressure is given by:

$$\Delta p_{load} = \frac{-I_{max}}{K_{load} + K_{channel}}, \qquad (4)$$

while the volume flow through the load is given by $$I_{vol}^{load} = K_{load}\Delta p_{load}. \qquad (5)$$

A specific choice of pump configuration will give rise to an electrical conductance of the pump canal $G_{canal}$. In response to the EOF driving voltage, the electrolyte inside the pump canal will carry the electrical current $I_q$. Design considerations associated with EOF pumps should comprise heat sinking due to the power dissipation in the pumps. Moreover, the location and design of electrodes should be considered. In an electrophysiology device, the natural choice of electrode material is AgCl, and hence the consumption of such electrodes when operating the pump should be considered. The rate of consumption of electrode material expressed in volume per time unit is given by:

$$\Delta V_{\Delta t} = \frac{I_q m_{AgCl}}{eN_A \rho_{AgCl}}, \qquad (6)$$

where $m_{AgCl}=143.321$ g/mol and $\rho_{AgCl}=5.589$ g/cm$^3$ is the molar mass and the mass density of AgCl, while $e=1.602\times 10^{-19}$C and $N_A=6.02\times 10^{23}$ mol$^{-1}$ is the elementary unit of charge and the Avogadro constant.

An alternative to the use of consumable electrodes is suggested which involves providing an external electrode linked to the chamber by an electrolyte bridge with high resistance to hydrodynamic flow. This might be a thin canal, similar to that providing the EOF pumping, but with a surface having low density of charged sites (low zeta potential) or where the surface has opposite polarity charge to the EOF pumping canal. In the latter case the low flow conductance canal to the counter electrode contributes towards the EOF pumping. Most wall materials tend, like glass or silica, to be negatively charged in contact with solutions at neutral pH. However it is possible to identify materials which bear positive charge. Alumina based ceramics may be suitable, especially if solutions are on the low pH side of neutral. Alternatively polymer or gel material, such as Agarose, polyacrylamide, Naflon, cellulose acetate, or other dialysis membrane-type materials may produce the bridge with high resistance to hydrodynamic flow. Preferably these should have low surface charge density or an opposite polarity to that of the EOF pumping canal.

Figure 2A:
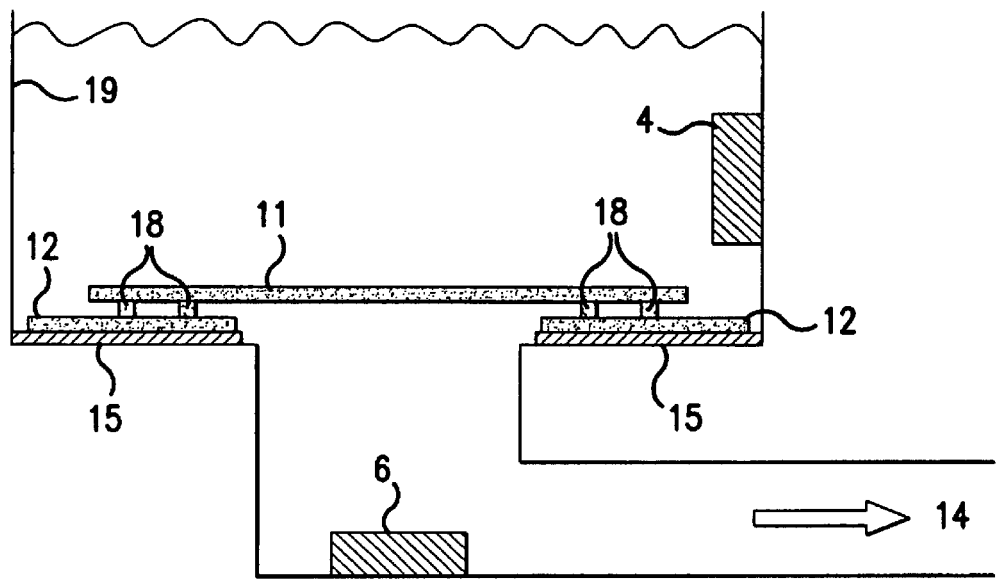
FIGS. 2A and B show a cross sectional and a top view of an embodiment of the Corbino disc EOF pump according to the present invention. The shown embodiment is applied to an electrophysiological measuring system for generating a flow for positioning of cells.
Figure 2B:
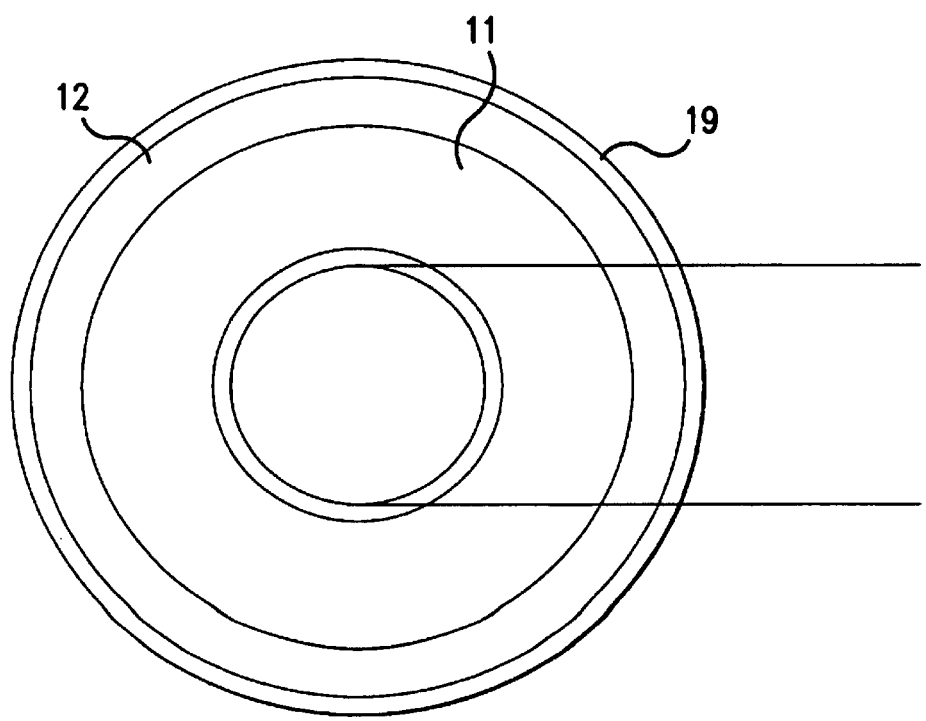

FIGS. 2A and B show a preferred embodiment of the Corbino disc EOF pump according to the present invention. The shown embodiment is applied to an electrophysiological measuring system for generating a flow for positioning of cells. FIG. 2A shows a side view of the device while 2B shows a top view. Two parallel plates 11 and 12 with glass or silica surfaces, having spacer blocks 18 inserted between them in order to keep the submicrometer distance between them, is fastened at the bottom of a pipetting well 19 using a sealing adhesive 15. When an electrical ion current is drawn between the electrodes 4 and 6, the pumping action takes place in the liquid-filled space between the closely spaced plates 11 and 12. The upper electrode 4 can either be integrated into the pipetting well (as shown) or be dipped into well from a device holder above. The arrow 14 indicates the fluidic connection to the rest of the device. To prime the EOF pump, liquid should be pipetted into the well above the parallel plates. To overcome the capillary forces, gas pressure should be supplied on top of the well in order to force liquid out of the space between the plates, down to the lower electrode 6. As soon as the liquid touches both electrodes 4 and 6 the EOF pump is functional and can take over the pumping.

The Corbino geometry according to the present invention is based on plates with silica or glass surfaces separated by spacers mounted in a laminated polymer holder. The spacing could be maintained by polymer spacer balls or spacers shaped by photolithography in SU-8 resist. In this geometry the plates have annular shape and the flow is radial with a drain in the centre. The distance between the plates h again has to be small compared with both the inner ($r_{in}$) and outer ($r_{out}$) radius of the annulus. This pump configuration is particularly suitable for integration into a pipetting well. The key parameters are given below

| Canal flow conductance | Max flow | Electrical conductance |
|---|---|---|
| $K_{channel} = \dfrac{\pi h^3}{6\eta \ln\left(\dfrac{r_{out}}{r_{in}}\right)}$ | $I_{max} = \dfrac{2\pi h}{\ln\left(\dfrac{r_{out}}{r_{in}}\right)} \mu_{eof} U$ | $G_{channel} = \dfrac{2\pi h}{\ln\left(\dfrac{r_{out}}{r_{in}}\right)} \sigma$ |

Figure 3:
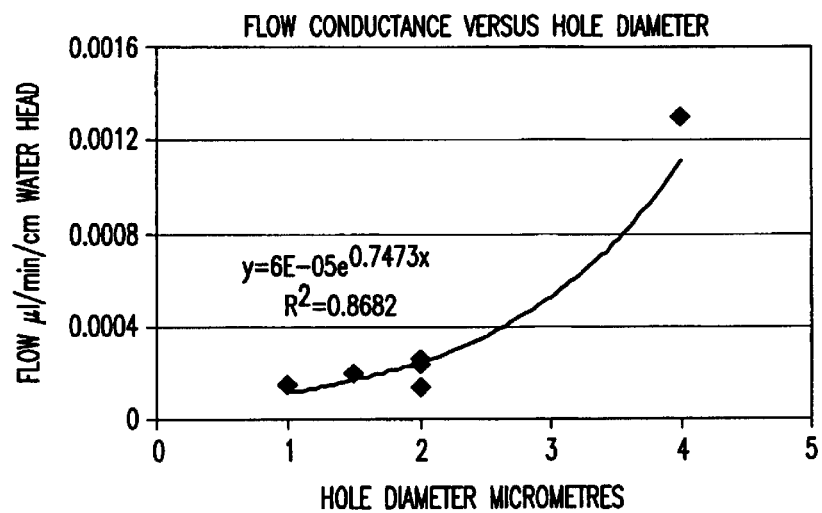
FIG. 3 is a graph showing the flow conductance versus hole diameter for the passage between the upper and lower part of the passage. This exemplifies the needed performance of electroosmotic pumps used in the electrophysiological measuring system of FIGS. 2A and B.

Below are given the key parameters for actual choices of pump dimensions. Feasible pump dimensions for applications related to microfluidics in an electrophysiology device would be: $r_{out}$=0.25 cm, $r_{int}$=0.1 cm, and h=0.5 µm. The calculations are based on conditions relevant for an electrophysiology device, where the liquid used is a physiological buffer solution. However, for most purposes the data corresponding to 150 mM NaCl solution are representative. The asserted electrical conductivity is σ=0.014 S cm$^{-1}$ and the viscosity η=8.94×10$^{-4}$ kg m$^{-1}$s$^{-1}$. The calculations are based on a voltage drive of U=100 V, and a conservative choice for the zeta potential ζ=15 mV. The flow conductance of the cell receptor passage, which is assumed to be the most significant load to the EOF pump, was determined experimentally for a number of hole diameters (See FIG. 3).

In the calculations a flow conductance $K_{passage}$=3 pl s$^{-1}$ mbar$^{-1}$ corresponding approximately to a 1 µm diameter hole is assumed.

| Parameter | Value |
|---|---|
| Flow conductance of pump canal $K_{canal}$ [pl s$^{-1}$ mbar$^{-1}$] | 7.99 |
| Maximum volume flow rate $I_{max}$ [nl s$^{-1}$] | 4.00 |
| Maximum pressure $\Delta p_{max}$ [mbar] | 500.7 |
| Performance power $\Delta p_{max} I_{max}$ [nW] | 200 |
| Pressure difference across load $\Delta p_{passage}$ [mbar] | 364.0 |
| Volume flow rate in load $I_{passage}$ [nl s$^{-1}$] | 1.09 |
| Eletrical conductance of pump canal $G_{canal}$ [µS] | 4.80 |
| Electrical current through pump canal $I_q$ [µA] | 480 |
| Power dissipation in pump $U I_q$ [mW] | 48 |
| Maximum thermal resistance of required heat sink to keep temperature rise below 20° C. [° C. W$^{-1}$] | 416.7 |
| Rate of consumption of AgCl electrodes $\Delta V_{At}$ [µm$^3$ s$^{-1}$] | 127800 |

The EOF pump design according to the invention can be fabricated by creating the configuration by 2 glass plates with ≅1 µm spacing. The spacing can be maintained by spacer balls or photoresist/adhesive layers. The structure can be formed using well known etching and photolithography techniques in a number of materials such as silicon or SU-8 photoepoxy. The configuration is suitable for integration into a pipette well for adding fluid as illustrated in FIG. 4.

Figure 4:
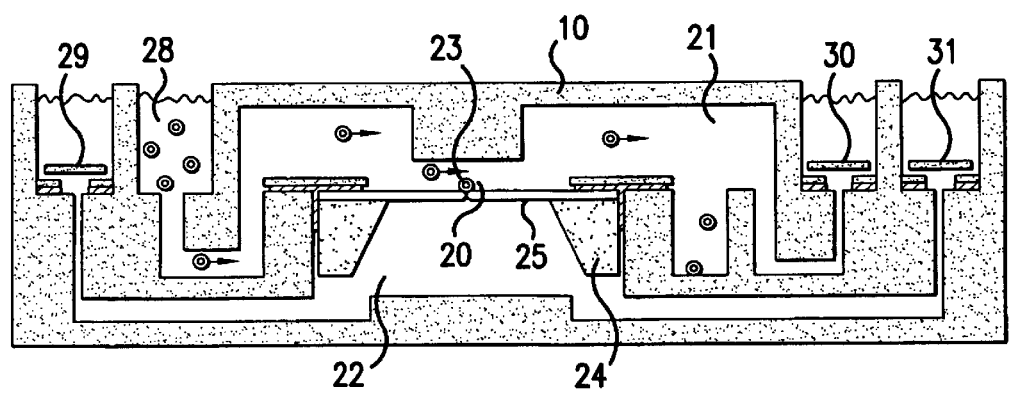
FIG. 4 is an illustration of another preferred embodiment of the present invention integrated in an electrophysiological measuring system.

The preferred embodiment illustrated in FIGS. 2A and B can be applied in an electrophysiological measuring system for the generation and control of liquid flow, this is shown in FIG. 4. The liquid flow is used to position cells in a desired measuring configuration. In FIG. 4, a housing 10 contains fluidic canals 21 an 22 separated by a microstructured unit 24 supporting a thin membrane 25 on its top surface. A passage in the membrane 25 is adapted to hold a cell 23 and forms the measurement site 20. The fluidic system consists of two separate flow systems. The first flow system consist of the canal 21 holding a cell solution. The canal 21 is in contact with the upper part of the membrane 25, an inlet 28 for adding the cell solution, and an outlet 30 with an EOF pump according to the present invention (electrodes are not shown, but can be located as shown in FIGS. 2A and B) for generating and controlling a flow in the cell solution in the canal 21. The second flow system consist of the canal 22 holding an intracellular buffer solution. The canal 22 is in contact with the lower part of the membrane 25, an inlet 29 and outlet 31 with EOF pumps according to the present invention (electrodes are not shown, but can be located as shown in FIGS. 2A and B) for generating and controlling a flow in the buffer solution in the canal 22. Cells 23 are introduced through the inlet 28 acting as a pipetting well and are transported through the fluidic system to the measurement site 20. The canal is narrowed in the proximity of the cell capture site 20 in order to enable cell detection using the Coulter counter principle.

In the following, a number of issues relevant for the present and many other applications of the EOF pump according to the invention will be described.

Priming is the process required to fill the device under consideration by liquid for the first time before operation. The electroosmotic driving force requires, that both electrodes are immersed in liquid before flow can be achieved. The different EOF pump configurations proposed may to some extent prime spontaneously by means of capillary forces in the narrow flow canals. However, it may not be possible to prime the whole pump chamber containing both electrodes solely by means of capillary forces. Considering the rate of consumption of the AgCl electrodes, thin film electrodes deposited between the glass plates are not likely to endure the whole operational cycle of the device. For the sieve configuration the situation may be even worse. Despite the device under consideration is considered to be disposable, bulk electrodes are preferable. A feasible solution to this problem could be the use of adequately located thin film electrodes only for priming of the pump chamber containing the bulk electrodes. The bulk electrodes can take over after the priming procedure. Another possible solution would be to prime the whole device by means of gas pressure drive applied to the pump and pipetting ports before proper operation. Even for devices with many parallel measure sites, the priming could readily be done for all sites in parallel, by pipetting liquid onto all sites and priming by gas pressure applied to all sites simultaneously.

In one possible cell positioning procedure, flow canals on a front side and a rear side of a membrane with a passage are incorporated into the device. The front side refers to the side where cells are loaded and where the extra cellular reference electrode for the electrophysiology measurement is placed, while the rear side refers to the side where suction is applied to drag the cells onto the opening of the passage, and where the intra cellular electrode is placed. The front side flow canal passes over the passage and is connected to a pump (EOF pump or any other pump with similar performance) at one end, and a pipetting well at the other end. The volume of the front side flow canal should be adequately low to ensure that once a cell has entered the canal, a flow maintained by the rear side pump to the passage is capable, within a short time, of dragging the cell to the position of the passage to establish the giga seal. A narrow front side flow canal enables the detection of cells passing the canal using the same principle as in a Coulter counter. The detection may be realised by an electrical measurement of the canal electrical resistance with two electrodes, one at each end of the canal. When a cell enters the flow canal it expels a volume of buffer solution, which consequently cannot contribute to the conductance. The relative change in electrical resistance is therefore given by the ratio of cell volume to canal volume. In addition a spreading resistance contribution is expected. This is however small if the cross sectional area of the cell is small compared to the cross sectional area of the flow canal. The change in canal resistance is calculated by:

$$\Delta R = R_c \frac{V_{cell}}{V_c} F_s, \quad (7)$$

where $V_{cell}$, and $V_c$ are the volumes of the cell and the canal respectively. $R_c$ is the electrical resistance of the canal and $F_s$ is the geometrical factor accounting for the spreading resistance associated with a cell being inside the canal. $F_s$ is a number slightly larger than 1, and depends on the relative cross sectional areas of the cell and the flow canal. If canal width becomes comparable to cell size, the geometrical factor may however be quite large, corresponding to the situation where the spreading resistance dominates over the buffer volume exchange effect. The rear side flow canal need not be very narrow, and should be equipped with either one pump port at one end and connected directly to the passage at the other end, or alternatively equipped with two pump ports, one at each end with the passage placed in the middle of the canal. The two pump ports version should be chosen if exchange of the intra cellular buffer is desired during operation of the device. A statistical approach may be employed in order to estimate the required waiting time before a cell loaded into the pipetting well connected to the front side flow canal has passed the canal with a certain probability. This probability will mainly depend on the concentration of cells in the suspension $C_c$, the average flow velocity $u_c$ in the front side flow canal and the cross sectional area $A_l$ of the flow canal. The average number of cells passing the canal during the time t can be found from:

$$\beta(t) = C_c A_l u_c t. \quad (8)$$

The probability p(t) that at least one cell has passed the canal during the time t is then given by the Poisson distribution:

$$p(t) = \sum_{n=1}^{\infty} \frac{\beta(t)^n \exp(-\beta(t))}{n!} \quad (9)$$

To demonstrate this positioning scheme one may for simplicity of calculation assume a front side flow canal of circular cross section of radius $r_c=25$ μm and length $L_c=0.25$ mm. The volume and flow conductance of this flow canal is respectively given by $V_c=0.5$ nl and $$K_c = \frac{\pi r_c^4}{8 \eta L_c} = 69 \text{ nl s}^{-1} \text{ mbar}^{-1}.$$

The average flow velocity of pressure driven Poiseuille flow will be 35 mm s$^{-1}$ per mbar of driving pressure difference. For a typical cell radius $r_{cell}=6$ μm, the resistance change given by Eq. 7 will be approximately 177Ω out of the total canal resistance of 90.9 kΩ, i.e. a relative change of 0.19%. Here a geometrical factor of 1.06, accounting for the spreading resistance, has been assumed. With a front side drive pressure difference of only 1 mbar, within 2 seconds 4.1 cells will on average have passed the canal, and at least one cell will have passed with probability 98.4%. This positioning scheme relies on the ability to stop the front side flow as soon as a cell has entered the canal. This requires fast electronics, and a method to avoid this is to consecutively apply small pressure pulses to the front side flow canal, until the presence of a cell inside the canal is detected by means of the Coulter counter principle. Considering the tiny volume of the front side flow canal any of the proposed EOF pump types mounted on the rear side flow canal would be able to suck the cell into position at the passage within a fraction of a second. The cell detection electronics of the Coulter counter can be made of the same type as needed in the electrophysiology measurements of ion channel response.

The Corbino disc EOF pump according to the invention is based on a versatile design and can be applied in numerous small-scale systems and devices, such as chips, Microsystems, micromachines, microstructures, microfluidic systems, etc. The electrophysiological measuring system described in the above, being a specific illustrative example, does not limit the scope of the invention or the range of possible applications.

What is claimed is:

1. An electroosmotic flow pump for generating a flow in an ionic solution from an inlet to an outlet in a canal, the electroosmotic flow pump comprising a housing with the canal for holding the ionic solution, a first electrode and a second electrode positioned so as to be in electrical contact with ionic solution held in the canal, means for impressing an electrical potential difference between the first and second electrodes, first at least substantially circular plate of radius $r_{out\ 1}$, a second at least substantially circular plate of radius $r_{out\ 2}$, having a central annular hole of radius $r_{in}$, the first and the second plate being positioned opposite each other in an at least substantially parallel and concentric configuration at a distance d in the canal so that an electrical path between the first and second electrodes passes the intervening space between the plates and the flow passes the intervening space between the plates and through the hole, wherein all lateral dimensions are much larger than the vertical dimension, $r_{out\ 1}$, $r_{out\ 2}$, $r_{in} >> d$, wherein facing surface parts of the first and second plates have a zeta potential $\zeta > 10$ mV in an 130–160 mM aqueous salt solution with pH value in the interval 7–7.5.

2. An electroosmotic flow pump according to claim 1, wherein the distance d between the first and second plates is in the interval 0.1–2 μm.

3. An electroosmotic flow pump according to claim 1, wherein the outer radii $r_{out\ 1}$ and $r_{out\ 2}$ of the first and second plates are in the interval 0.02–1.0 cm.

4. An electroosmotic flow pump according to claim 1, wherein the inner radius $r_{in}$ of the hole in the second plate is in the interval 0.01–0.5 cm.

* * * * *